United States Patent Office 2,732,184
Patented Jan. 24, 1956

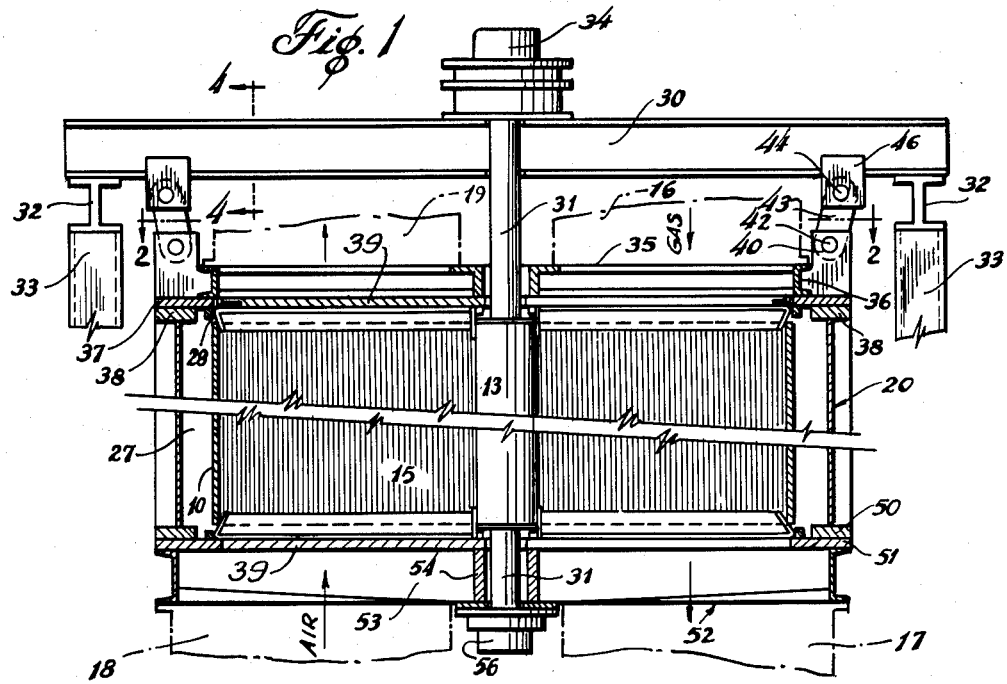

2,732,184
PIVOTALLY SUPPORTED HOUSING FOR ROTARY REGENERATORS

Clayton A. Ballard, Belmont, and Edward P. Horn, Wellsville, N. Y., assignors to The Air Preheater Corporation, New York, N. Y.

Application August 14, 1951, Serial No. 241,822

3 Claims. (Cl. 257—6)

The present invention relates to regenerative air preheaters of the rotary type and particularly to improved means for constructing and mounting them so as to minimize distortion and misalinement due to mechanical or thermal stresses.

The conventional rotary regenerative apparatus includes a cylindrical rotor carrying metallic heat transfer plates that absorb heat as from waste combustion gases that flow thereover and then impart the heat to air which subsequently flows over the plates. The rotor is mounted in a housing provided with end plates to which the inlet and outlet ducts for gas and air are connected. The housing is provided with supporting feet or pads that rest on the structural steel of the boiler or other apparatus with which the preheater is associated. The housing usually includes a supporting beam above the rotor which carries the support bearing for the rotor with the result that the weight of the rotor is imparted to the housing. Because of mechanical stresses imposed by this manner of construction and also due to thermal stresses imposed unequally on parts of the housing as a result of the flow of the hot gas and relatively cool air over the different parts, the set clearances for the usual seals between the rotor and housing are disturbed with consequent gas leakage.

The present invention contemplates independently supporting a preheater rotor and its enclosing housing so as to minimize mechanical stresses and also reduce the effect of unequal thermal forces on the housing and rotor. This will best be understood upon consideration of the following detailed description of an illustrative embodiment of the invention when read in conjunction with the accompanying drawings in which:

Figure 1 is an axial sectional view of a rotary air preheater embodying the invention as viewed on line 5—5 in Figure 2.

Figure 2 is a plan view of the preheater as viewed on the line 2—2 in Figure 1.

Figure 3 is a sectional view on the line 3—3 in Figure 2, and

Figure 4 is a sectional view on the line 4—4 in Figure 1.

Figure 5 is an enlarged sectional view of the expansible sector plate assembly of Figure 1.

In Figure 1 of the drawings the numeral 10 designates a rotor having a cylindrical shell divided into sector shaped compartments by radial partitions 11 (Fig. 2) connecting it with the rotor post 13 which is driven by a motor and reduction gearing to turn the rotor slowly about its axis. The rotor compartments contain regenerative heat transfer material in the form of closely spaced metallic plates 15 which first absorb heat from hot gases entering the preheater through a duct 16 from a boiler or other source to be discharged after passing over the heat transfer plates 15 through an outlet duct 17 to which an induced draft fan is connected. As the rotor turns slowly about its axis, the heated plates 15 are moved into the stream of air admitted through the duct 18 to which a forced draft fan is connected and after passing over the plates 15 and absorbing heat therefrom the stream of air is conveyed to the boiler furnace or other place of use through duct 19.

A housing 20 enclosing the rotor 10 is provided at either end opposite the latter with upper and lower end or sector plates 39 which are apertured at 23 and 24 (Fig. 2) in circumferentially spaced locations to admit and discharge streams of gas and air flowing through the rotor. In order that the streams of gas and air may not commingle, the end plates 39 have imperforate portions 25 located between the gas and air openings that are at least equal to but usually somewhat greater in circumferential extent than one rotor compartment for engagement by radial seals on partitions 11 to isolate or block off at least one compartment when it is in a position between the gas and air passages. In order that the streams of gas and air may not by-pass the heat transfer surface 15 by flowing axially in the annular clearance space 27 between the rotor shell 10 and the housing 20 it is customary to provide circumferential seals, indicated diagrammatically at 28, on the shell 10 which wipe against confronting parts of the end plates 39 or allied parts so as to seal off the space 27.

In accordance with the present invention the rotor 10 is directly suspended from a beam 30 that extends transversely of the preheater in the plane of the axis of the rotor shaft 31. Beam 30 is supported at or near its ends on the horizontally spaced beams 32 which in turn rest upon the structural steel members 33 that extend alongside the preheater and may form part of the structural support for the boiler or other apparatus with which the preheater is associated. The transverse beam 30 has mounted thereon the support bearing 34 into which the shaft 31 extends so that the rotor 10 is suspended from the beam for rotary movement within its housing 20. The housing in turn is supported from the so-called "connecting plate" 35 to which the air inlet and gas outlet ducts are connected and which is located in usual manner between these ducts and the upper end plate 39. The connecting plate 35 according to this invention is in the form of a circular beam 36 having at its lower perimeter an annular flange 37 which projects radially and is connected to the upper flange 38 of the housing 20 for supporting the latter. The connecting plate 36 is also provided with upstanding lugs 40 and 41 located in diametrically spaced pairs and in spaced relation at opposite sides of a plane passing through a rotor axis as appears in Figure 2. The lugs 41 are connected by pins 42 to the lower ends of suspension links 43 connected at their upper ends by pins 44 to riders 46 which have laterally extended flanges 47 (Fig. 4) engaging with the side flanges 48 on the transverse support beam 30. With this construction the housing is pivotally supported from the transverse beam 30 entirely independently of the support for the rotor 10.

A flange 50 at the lower end of the rotor housing is connected to a flange 51 on the lower "connecting plate" which is in the form of a circular beam 52 and has radial channels or webs 53 extending to a semi-circular columnar portion 54 extending around the lower end of the rotor shaft 31 and forming a collar to which the lower guide bearing 56 for the shaft may be attached.

The upper end plate is mounted so that it may expand independently of both the housing and rotor. The upper "connecting plate" 35 is provided with two pairs of radially extending webs in the form of arcuately bent I-beams 60, 61 that merge at their inner ends into complementary semi-circular member 62 which form a collar about the rotor shaft 31. Each pair of beams 60, 61 is connected together by the tie plates 63. The pairs of beams 60, 61 are located above the imperforate portions 25 of end plates 39 that intervene between the gas and air openings 23, 24 so that supporting angles 64 attached to the radial edges of the imperforate portions of the sector plate may engage the lower flanges 65 on the beams 60, 61. The end plates 39 are of circular form and its outer peripheries are aligned and spaced with their connecting plate flange 37 so that the end plates 39 may expand and contract in the radial direction as required without imposing any distorting force on either the connecting plate 35 or parts of the housing 20 that enclose the rotor 10.

With this construction the weight of the rotor 10 is transferred to the structural steel 33 of the boiler without subjecting the housing 20 to the stress imposed by the rotor weight. The separate supporting of the rotor frees the housing of carrying the rotor weight and enables the housing to be designed as a light duct for confining and guiding the streams of gas and air which should be its primary function. This method of preheater housing support allows for the growth, and difference in growth of the upper and lower plates, without affecting seal clearance, or subjecting the housing structure to stress. Provision of expansion joints between end plates and housing flanges prevents carrying thermal expansion stress from the end plates to the housing structure. The construction permits radial movement of the housing upon expansion and contraction without imposing any stresses because the pivoted support links 43 accommodate these movements. Supporting the housing structure in this manner at two points with a pivoted link connection allows for thermal expansion free from stresses for the housing flange 37. The links are preferably set at a slight angle from the vertical with their lower ends further inwardly so that thermal expansion occurs with negligible vertical movement of the heater housing thus minimizing any disturbance of the normal clearances between the seals of the rotor and housing.

What we claim is:

1. In an air preheater or like apparatus having a cylindrical rotor turning with a vertical shaft and carrying material for contact by hot and relatively cool fluids and a housing surrounding the rotor and provided with end plates formed at opposite sides of the rotor axis with apertures for the flow of said fluids; a horizontal beam fixed to upright structural work is at the sides of the preheater assembly and extending centrally across the top of the preheater; a bearing mounted on said beam and connected to the shaft of the rotor for suspending the latter from said beam; a duct connecting member of continuous form positioned between said beam and the preheater and attached to the housing; at least a pair of pivoted link means having their upper ends connected to said beam at points spaced equally on either side of the rotor shaft and their opposite ends pivotally connected to said member to permit unequal expansion and contraction of the housing.

2. An air preheater structure as recited in claim 1 wherein the upper ends of said link means are connected to said beam at points spaced equally on either side of the rotor shaft and further apart than the link ends at said connecting member.

3. An air preheater structure as recited in claim 1 having radially extending means slidably supporting an end plate on the connecting member to permit thermal expansion of said plate independently of said housing surrounding said rotor.

References Cited in the file of this patent

UNITED STATES PATENTS

| | | |
|---|---|---|
| 1,230,441 | Stevens | June 19, 1917 |
| 1,792,446 | Puckett | Feb. 10, 1931 |
| 2,210,522 | Berkoben et al. | Aug. 6, 1940 |
| 2,224,787 | Horney | Dec. 10, 1940 |
| 2,287,777 | Boestad | June 30, 1942 |
| 2,337,907 | Lundstrom | Dec. 28, 1943 |
| 2,379,506 | Yerrick et al. | July 3, 1945 |
| 2,516,992 | Hochmuth | Aug. 1, 1950 |

FOREIGN PATENTS

| | | |
|---|---|---|
| 700,760 | Germany | Dec. 30, 1940 |